US005361501A

United States Patent [19]

Fajnsztajn

[11] Patent Number: 5,361,501

[45] Date of Patent: Nov. 8, 1994

[54] IMPROVED GUARD FOR POWER CIRCULAR SAW

[76] Inventor: Aleksander Fajnsztajn, P.O. Box 6684, San Rafael, Calif. 94903

[21] Appl. No.: 120,571

[22] Filed: Aug. 23, 1993

[51] Int. Cl.[5] .......... B23D 45/16

[52] U.S. Cl. .......... 30/391; 30/390

[58] Field of Search .......... 144/252 R; 30/390, 391

[56] References Cited

U.S. PATENT DOCUMENTS 3,701,369 10/1972 Gronke et al. .......... 30/391

4,589,208 5/1986 Iwasaki et al. .......... 30/391

5,235,753 8/1993 Stumpf .......... 30/391

*Primary Examiner*—W. Donald Bray

*Attorney, Agent, or Firm*—Harold D. Messner

[57] ABSTRACT

A telescopic movable guard surrounding a circle saw as its internal section equipped with a circular disc positioned so that the movement of the wood being cut is not impeded by the action of the saw blade and wood chips and forward movement in the lower guard is facilitated.

6 Claims, 3 Drawing Sheets

IMPROVED GUARD FOR POWER CIRCULAR SAW

FIELD OF INVENTION

This invention relates to Dower driven circular saws and to guards used to provide safety in their use. These are commonly known in the art as "skil saws", as hereinafter more fully described.

BACKGROUND OF THE INVENTION AND PRIOR ART

Applicant is not aware of any prior art directed to improve the safety of saws of this class other than that on well known construction in which an upper and lower guard are positioned to surround the blades of the circle saw, the lower guard being constructed to surround the lower or cutting portion of the saw and to telescope within the upper guard, surrounding it as the saw advances. The summary of the prior art is illustrated on FIG. 1.

It has been found that as the piece being cut advances along the saw and the lower guard advances to protect it, the wooden chips, circle lower guard and saw are inclined to jam preventing further progress of the saw and requiring release of the upper jaw. This is especially true of cutting small pieces or cutting on an incline release of the upper guard creates a hazard. This jamming prevents movement of the piece to be cut within the lower guard.

That is to say, because the lower guard has coextensive upright sections of differing shape at both leading and trailing edges, the workpiece can have a combination of height and end edge location that allows the workpiece to bypass contact with both leading edges of the lower guard and only make jamming contact with the trailing edge of the less upright and shorter section of the lower guard.

I have invented a device which I choose to call a "movement augmenter" which attaches to the lower guard and is positioned so that it permits movement of the lower guard and prevents jamming. The device comprises a thin cylindrical disc which attaches to the lower guard and assists in pushing the latter forward by the action of the piece being cut and releases the jamming between blade, guard and chips. This is shown seperable at 12 and held in position by screws 13 against guard 5 or cast integral with guard 5 as shown on FIG. 5.

DESCRIPTION OF A PREFERRED EMBODIMENT

Figure 1:
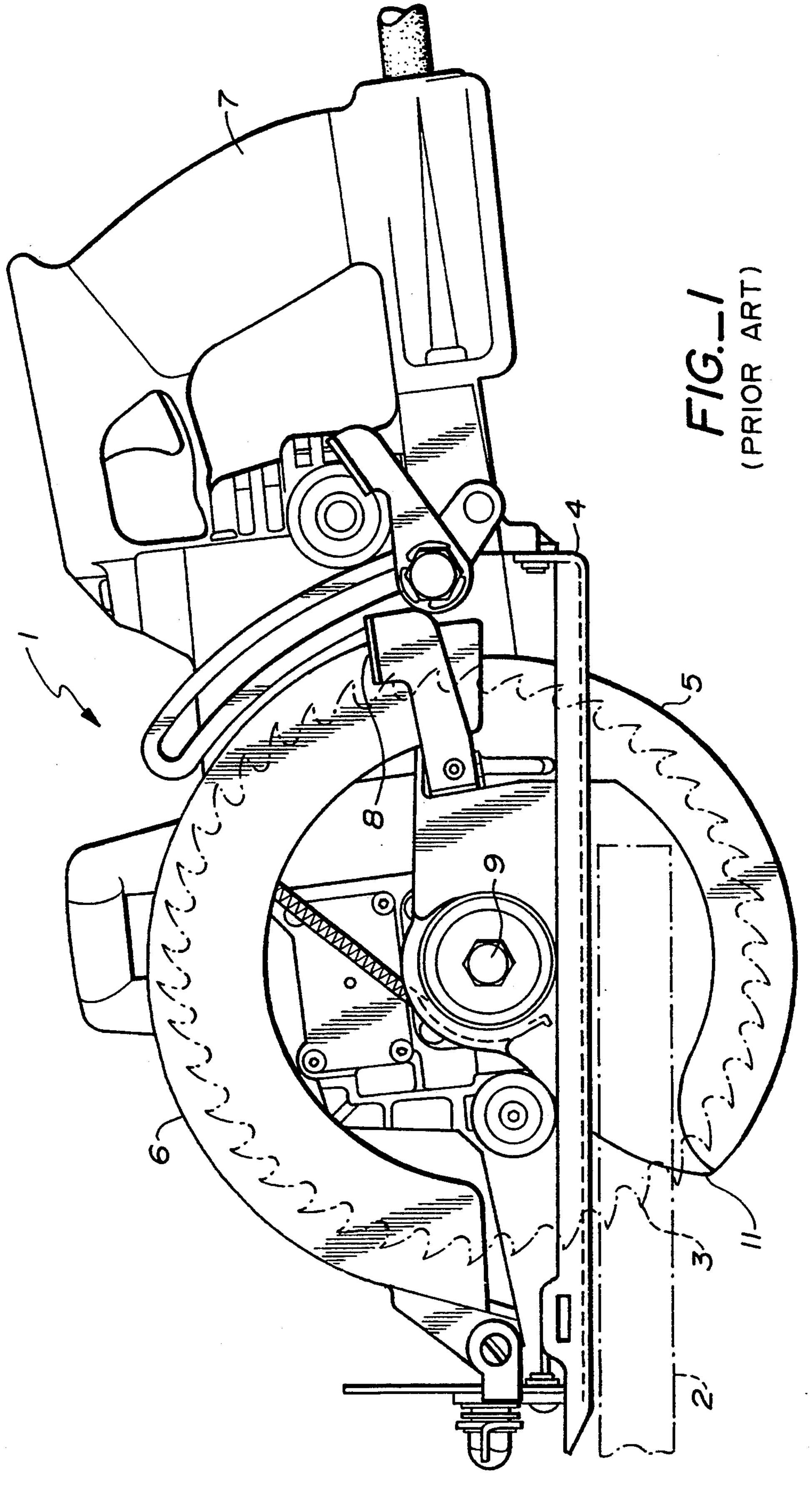
FIG. 1 (PRIOR ART)
FIG. 1 Side view of an existing machine without guard improvement (prior art).
Figure 2:
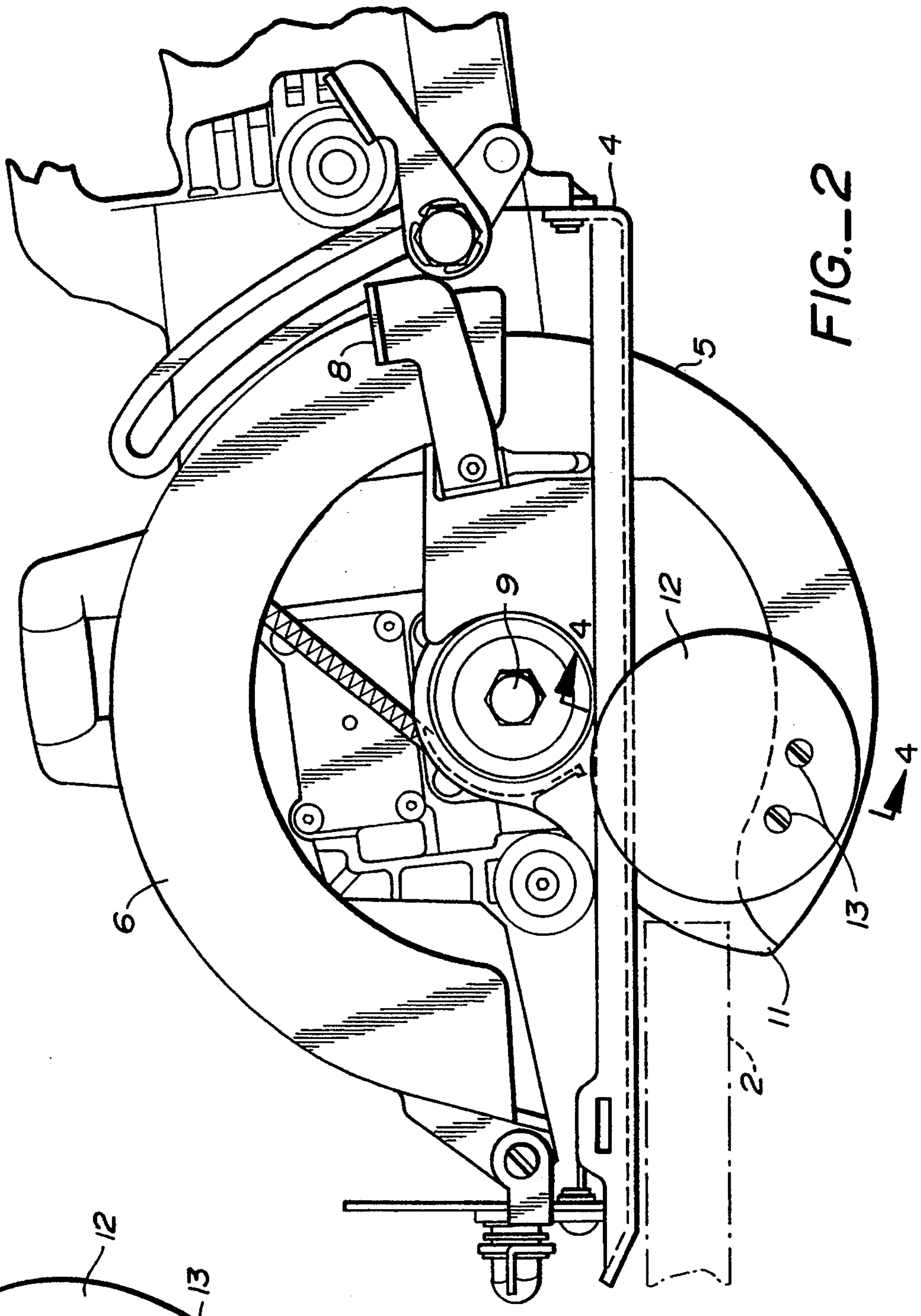
FIG. 2. Side view of machine showing guard improvement in place via a pair of fasteners.
Figure 3:
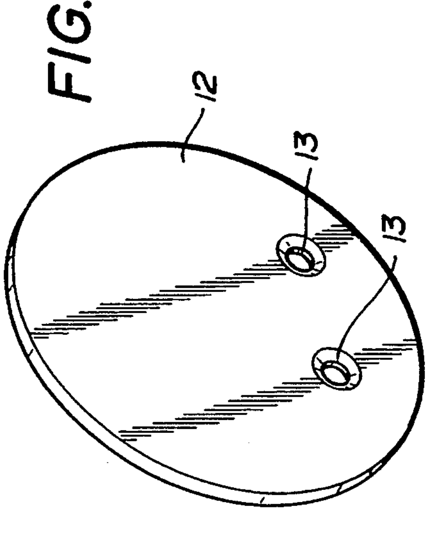
FIG. 3. Shows guard improvement separately.
Figure 4:
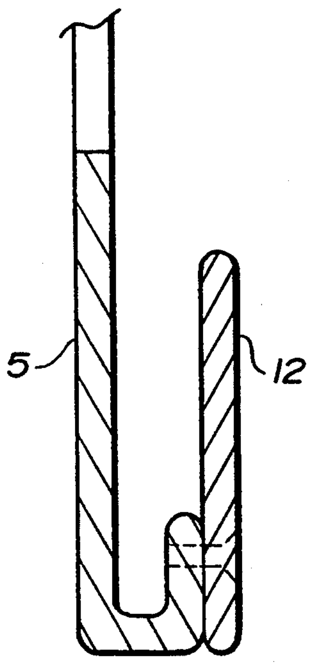
FIG. 4. A section taken along line 4—4 of FIG. 2 showing guard and removable improvement in position.
Figure 6:
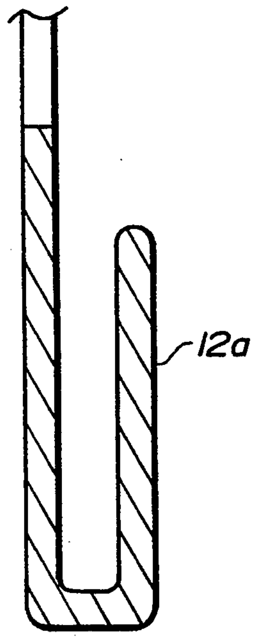
FIG. 6. Shows a section taken along line 6—6 of FIG. 5 lower guard improvement part of lower guard.
Figure 5:
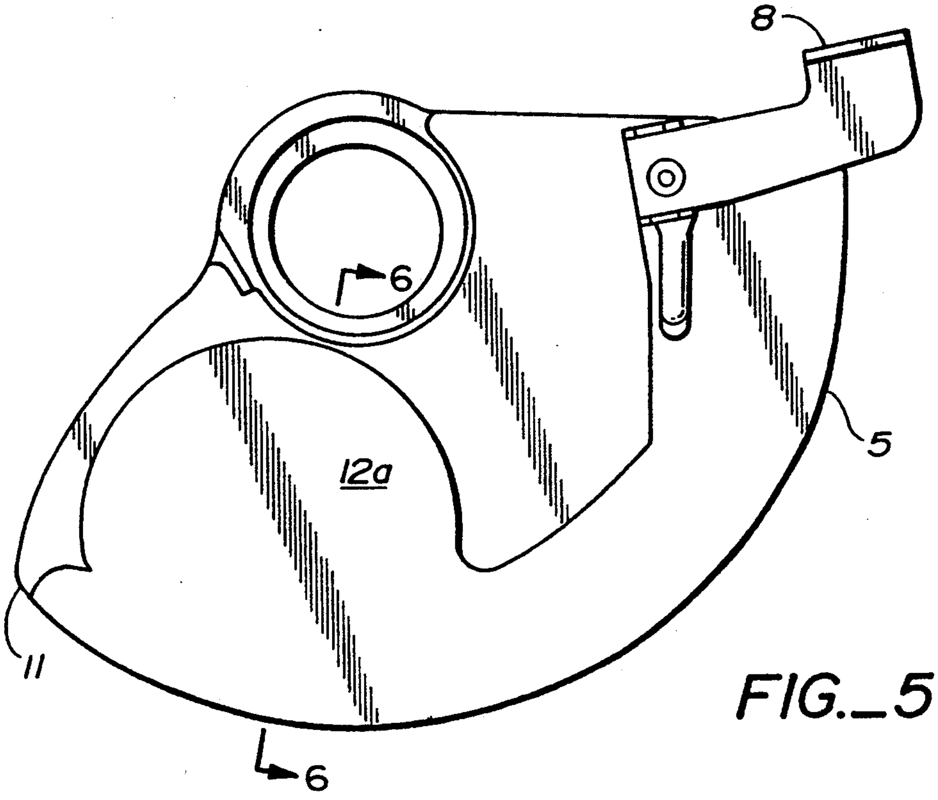
FIG. 5. Shows side view of an alternate improvement of lower guard member of FIG. 2 in position in which the improvement is integrally formed with respect the lower guard.

Referring now to the figures, the total assembly of the machine or tool as ordinarily used in the trade and sometimes referred to as a "skil saw" is designated as 1.

The item to cut out which may be a wooden member is shown at 2 and shown advancing against rotating blade 3 travelling on slide member 4 and protected by inner guard 5 protecting blade 3 and arranged for telescoping motion inside outer guard 6, spring loaded by control 8.

The operating handle of the portable unit is shown at 7.

An engaging lip 11 is provided at the receiving end of the inner guard to aid in starting the operation.

I have found that in order to function efficiently the augmenter 12 or **12*a* may be of any convenient thickness such as $\frac{1}{8}''$ and a circumference of $2\frac{3}{4}''$. It should be located so that its outer periphery is close to but does not engage the mounting nut 9**.

The disc should further be located along the outer guard so that its outer circumference would be located in close proximity to the outer edge of the inner guard of the order of magnitude of $\frac{1}{2}''$ to $\frac{3}{4}''$ depending on the tool itself. The main thing is to base the point of the augmenter to advance the inner guard as the saw progresses.

I claim:

1. In a lower guard for a circular, portable saw comprising two upright sections each having a leading edge and a trailing edge in a relaxed state of said saw, and a transverse section surrounding at least a portion of blade teeth of said saw wherein one of said upright sections is rotatable attached to said saw and the other section depends from said one section through said transverse section, a device to prevent the work item being cut from jamming against said trailing edge of said other of said upright sections of said lower guard of said circular saw and preventing rotational motion of said lower guard; comprising a thin circular disc fixedly attached to said other of said upright sections of said lower guard so as aid the circular movement of said lower guard and prevent jamming thereof, said disc having a diameter substantially greater than the total upright extent of said other section of said lower guard so as to substantially increase the vertical extent of the leading edge of said other section of said lower guard in said relaxed state of said saw.

2. The device of claim 1 in which said circular disc is located in close proximity to said leading edge of said other of said upright sections of said lower guard.

3. The device of claim 2 in which said circular disc is approximately $\frac{5}{8}''$ thick and approximately $2\frac{3}{4}''$ in diameter and is positioned so that its leading edge extends above said vertical extent of said other section at a point that is downstream of said leading edge of said other section by approximately $\frac{1}{2}''$.

4. The device of claim 1 in which said circular disc and said other of said upright sections of said lower guard comprise a single piece.

5. The device of claim 4 in which said circular disc is removably attached to said internal guard.

6. The device of claim 2 in which said circular disc includes a trailing edge longitudinally spaced from said trailing edge of said other of said upright sections of said lower guard to permit debris from cutting of said work item to exit therethrough.

* * * * *